United States Patent
Yang et al.

(10) Patent No.: US 10,157,691 B2
(45) Date of Patent: Dec. 18, 2018

(54) METHOD FOR TREATMENT OF SPENT RADIOACTIVE ION EXCHANGE RESINS

(71) Applicant: KOREA ATOMIC ENERGY RESEARCH INSTITUTE, Daejeon (KR)

(72) Inventors: Hee-Chul Yang, Daejeon (KR); Min-Hoon Baik, Daejeon (KR); Hyung-Ju Kim, Daejeon (KR); Dong Yong Chung, Daejeon (KR); Jong-Won Choi, Daejeon (KR)

(73) Assignee: KOREA ATOMIC ENERGY RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/358,216

(22) Filed: Nov. 22, 2016

(65) Prior Publication Data

US 2017/0148535 A1    May 25, 2017

(30) Foreign Application Priority Data

Nov. 25, 2015    (KR) ................. 10-2015-0165723

(51) Int. Cl.

| | |
|---|---|
| *G21F 9/04* | (2006.01) |
| *G21F 9/08* | (2006.01) |
| *C02F 1/42* | (2006.01) |
| *G21F 9/12* | (2006.01) |
| *G21F 9/16* | (2006.01) |
| *G21F 9/30* | (2006.01) |
| *C02F 101/00* | (2006.01) |
| *C02F 103/02* | (2006.01) |

(52) U.S. Cl.
CPC .............. *G21F 9/08* (2013.01); *C02F 1/42* (2013.01); *G21F 9/12* (2013.01); *G21F 9/16* (2013.01); *G21F 9/30* (2013.01); *C02F 2101/006* (2013.01); *C02F 2103/023* (2013.01); *G21Y 2002/60* (2013.01); *G21Y 2004/201* (2013.01)

(58) Field of Classification Search
CPC ..... G21F 9/04; G21F 9/08; G21F 9/12; G21F 9/16; G21F 9/30; G21F 9/001; C02F 1/42
USPC ....................................... 588/2, 18
See application file for complete search history.

(56) References Cited

U.S. PATENT DOCUMENTS

| | | | | |
|---|---|---|---|---|
| 5,202,062 A | * | 4/1993 | Baba ................. | G21F 9/008 210/754 |
| 2013/0123564 A1 | * | 5/2013 | Mason ................ | G21F 9/02 588/319 |

FOREIGN PATENT DOCUMENTS

| | | |
|---|---|---|
| JP | S57-118199 A | 7/1982 |
| JP | H03-264898 A | 11/1991 |
| JP | 2002-521701 A | 7/2002 |
| JP | 2004-508464 A | 3/2004 |
| JP | 2008-249421 A | 10/2008 |
| KR | 2002-0031822 A | 12/2003 |
| KR | 2008-0087360 A | 10/2008 |
| KR | 2013-0071776 B1 | 12/2014 |

OTHER PUBLICATIONS

Japanese Office Action dated May 28, 2018, in connection with corresponding JP Application No. 2016-223383 (7 pgs., including English translation).

* cited by examiner

*Primary Examiner* — Edward M Johnson
(74) *Attorney, Agent, or Firm* — Maier & Maier, PLLC

(57) ABSTRACT

[A] method and an apparatus for the treatment of waste ion exchange resins containing radionuclides, and further relating to a method for the treatment of waste ion exchange resins containing radionuclides by the stepwise heat treatment and an apparatus to accomplish the method.

10 Claims, 7 Drawing Sheets

METHOD FOR TREATMENT OF SPENT RADIOACTIVE ION EXCHANGE RESINS

BACKGROUND OF THE INVENTION

1. Field of the Invention

The present invention relates to a method and an apparatus for the treatment of waste ion exchange resins containing radionuclides. More precisely, the present invention relates to a method for the treatment of waste ion exchange resins containing radionuclides by the stepwise heat treatment and an apparatus to accomplish the said method.

2. Description of the Related Art

The basic concept of treating liquid radioactive waste in light water nuclear power plants in Korea is to treat the waste by evaporating using a waste liquid evaporator, concentrating, and solidifying thereof using paraffin as a solidifying agent. However, all the different impurities included in the radioactive waste liquid generate foams and scales in the evaporator, and accordingly the performance of the evaporator is reduced and the operation costs is increased because of the frequent maintenance, resulting in the problem of continuous running of the evaporator. To solve the problem, studies have been actively going on about the method for the treatment of waste liquid using organic/inorganic ion exchange resins, microfiltration or ultrafiltration membranes, and reverse osmosis membranes.

The ion exchange resin being used to treat radioactive waste liquid is prepared by combining a polymeric gas in a fine three-dimensional structure with an ion exchanger, which is composed of the polymers to exchange and purify the ionic substances dissolved in the polar or non-polar solution. The system of purifying waste liquid is accomplished by replacing the movable ions included in the ion exchange resin with other ions. Such ion exchange resin has been used in various water treatment processes for the purpose of separation, purification, and decontamination. Particularly in nuclear power industry, the ion exchange resin has been used to purify cleaning water or cooling water in a nuclear power plant. However, the ion exchange resin becomes a waste ion exchange resin when it is worn out. The waste ion exchange resin is still in the form of a polymer having excellent mechanical strength or chemical resistance, and the functional group on the surface of the waste ion exchange resin remains as the ion exchange form after the replacement with radionuclides. Therefore, it is very difficult to separate and extract the radionuclide attached on the resin, making the waste ion exchange resin one of the most difficult combustible radioactive wastes to treat in a nuclear power plant.

The waste ion exchange resin generated in the course of purification in a nuclear power plant includes two different types of resins. One is the CPP (condensate polishing plant) waste resin produced in the course of condensation water purification in a condensing turbine and the BD (blowdown) waste resin produced in the course of steam generator blowdown system water purification, which have a comparatively low radioactivity level, and the other is the waste resin generated in the course of liquid waste purification in Liquid Radwaste System (LRS). In general, each reactor produces approximately 5,000~7,000 l of waste resin every year. These waste resins are put in a gunny bag or a carbon steel drum, according to the radioactivity level, which are stored in a plant temporarily for permanent disposal. If radioactivity is detected in the waste resin produced in a nuclear power plant even though it is a trace of radioactivity, the whole waste resins are supposed to be stabilized and then put into a drum, which is shipped to the Radioactive Waste Repository Site. If the radioactivity of the radioactive waste is not reduced down to the radioactivity level that can be self-disposal, it is impossible to treat it as a general waste. In particular, if there is a leak in the capillary tube of a steam generator, the waste resin produced in the course of steam generator secondary side blowdown system water purification is contaminated by such radionuclides as radioactive carbon (C-14), radioactive cesium (Cs-137), and radioactive cobalt (Co-60) having a long half-life. The radioactivity detected in the contaminated waste resin cannot be completely eliminated even after the long-term storage, so that it cannot be classified and treated as a general waste.

Therefore, it is very important to develop a technique or a method to separate, extract, and eliminate radionuclides from the contaminated waste resin as completely as it can be self-disposed in relation to the reduction of waste and treating costs.

In regard to the method for treating waste ion exchange resin, Korean Patent No. 10-2008-0087360 describes a radioactive waste ion exchange resin dehydration apparatus to increase treatment efficiency by increasing the treatment volume of the radioactive waste ion exchange resin. Particularly, the patent describes a radioactive waste ion exchange resin dehydration apparatus composed of the porous container having pores on the bottom and receiving radioactive waste ion exchange resin; the middle container for the storage of the porous container to protect the porous container; and the shield container containing the middle container and providing a shield from the radioactivity coming from the radioactive waste ion exchange resin.

In the said invention, the volume of the radioactive waste resin could be reduced, but the problem of generation of exhaust gas containing $SO_2$ and $SO_2$ and production of $CO_2$, the greenhouse gas, in the course of the process was not solved.

Another example of the conventional method for treating waste ion exchange resin is to incinerate a combustible organic component to make it gas by pyrolysis or oxidation and at the same time to stabilize an inorganic component containing radionuclides such as ash (incineration ash) by glassification.

An example of the method above to treat waste ion exchange resin by incineration and glassification is described in Korean Patent No. 10-2002-0031822 with the device and process for incinerating and melting radioactive wastes. Particularly, the patent above describes an equipment and process for the treatment of the off-gas generated in the course of glassification of the combustible low and intermediate level radioactive wastes by incinerating and melting thereof.

The method based on the incineration and glassification has an advantage of providing a maximum volume reduction effect by holding another inorganic substance that is included in an organic component like a minute amount of ash together with radionuclides. But the problem is that the production of $CO_2$, the greenhouse gas, is increased during the gasification of all the organic components and in that course not only toxic gas such as sulfur dioxide gas, unburned hydrocarbon, dioxin, and nitrogen oxide (NOx) but also radioactive cesium (Cs-137, Cs-134), the high temperature volatile radionuclide, can be discharged by gasification.

Most waste ion exchange resins generated in a nuclear power plant and other related facilities are organic materials that are combustible. So, the conventional method depending on incineration or pyrolysis is advantageous in reducing the volume of the waste ion exchange resin by incineration or pyrolysis but has problem of discharge of radionuclides from the waste ion exchange resin together with exhaust gas during the process.

Therefore, it has been requested to develop a novel method to treat waste ion exchange resin that can overcome the problem of $CO_2$ and sulfur oxide generation during the treatment of waste ion exchange resin and can bring the effect of collecting and reducing radionuclides.

The present inventors tried to develop a method to treat waste ion exchange resin containing radionuclides. As a result, the inventors developed a method for the treatment of waste ion exchange resins containing radionuclides by the stepwise heat treatment. The method of the invention is to separate and collect radionuclides by volatilizing radionuclides through the stepwise heat treatment without the gasification of carbon, the major component of waste ion exchange resin. The present inventors completed this invention by confirming that the developed method can overcome such problems generated by the conventional incineration and vitrification as deposition pollution caused in the process of exhaust of volatile radionuclides including cesium (Cs) or strontium (Sr); discharge of the same in the air; generation of exhaust gas containing high contents (at least thousands of ppm) of $SO_2$ and $SO_3$ generated during the separation of an ion exchanger; and production of $CO_2$, the greenhouse gas, due to the treatment of waste ion exchange resins containing radionuclides, and has the maximum volume reduction effect resulted from the treatment of the volatilized radionuclides after the condensation and immobilization thereof.

PRIOR ART REFERENCE

Patent Reference (Patent Reference 1) Korean Patent No. 10-2008-0087360
(Patent reference 2) Korean Patent No. 10-2002-0031822

SUMMARY OF THE INVENTION

It is an object of the present invention to provide a method for treating waste ion exchange resins containing radionuclides and an apparatus to execute the method.

To achieve the above object, the present invention provides a method for treating waste ion exchange resins containing radionuclides comprising the following steps:
drying waste ion exchange resins containing radionuclides (step 1);
separating the ion exchanger containing radionuclides from the dried waste ion exchange resin (step 2);
converting the volatile compound containing radionuclides obtained from the ion exchanger separated above into non-volatile sulfur oxides containing radionuclides (step 3);
converting the sulfur oxides containing radionuclides above into chlorides containing radionuclides (step 4); and
separating and collecting radionuclides from the chlorides containing radionuclides above by volatilization and condensation (step 5).

The present invention also provides an apparatus for the treatment of waste ion exchange resins containing radionuclides, which is composed of:

a dryer (100) to dry the waste ion exchange resin containing radionuclides;
a screw conveyor reactor (400) to heat-treat the dried waste ion exchange resin discharged from the dryer above, stepwise; and
an inorganic chlorination reactor (600) to convert the reactant discharged from the screw conveyor reactor above into a chloride.

Advantageous Effect

The present invention relates to a method for the treatment of waste ion exchange resin containing radionuclides. More precisely, the method of the invention is characterized by the separation and collection of radionuclides via volatilization by the stepwise heat-treatment without gasification of carbon, the major component of the waste ion exchange resin. So, the present invention has the effects of preventing such problems generated by the conventional incineration and vitrification as deposition pollution caused in the process of exhaust of volatile radionuclides including cesium (Cs) or strontium (Sr); discharge of the same in the air; generation of exhaust gas containing high contents (at least thousands of ppm) of $SO_2$ and $SO_3$ generated during the separation of an ion exchanger; and production of $CO_2$, the greenhouse gas, due to the treatment of waste ion exchange resins containing radionuclides, and has the maximum volume reduction effect resulted from the treatment of the volatilized radionuclides after the condensation and immobilization thereof.

BRIEF DESCRIPTION OF THE DRAWINGS

The application of the preferred embodiments of the present invention is best understood with reference to the accompanying drawings, wherein:

FIG. 1 is a schematic diagram illustrating the process of treating waste ion exchange resin containing radionuclides of the invention.

DESCRIPTION OF THE PREFERRED EMBODIMENTS

Figure 1:
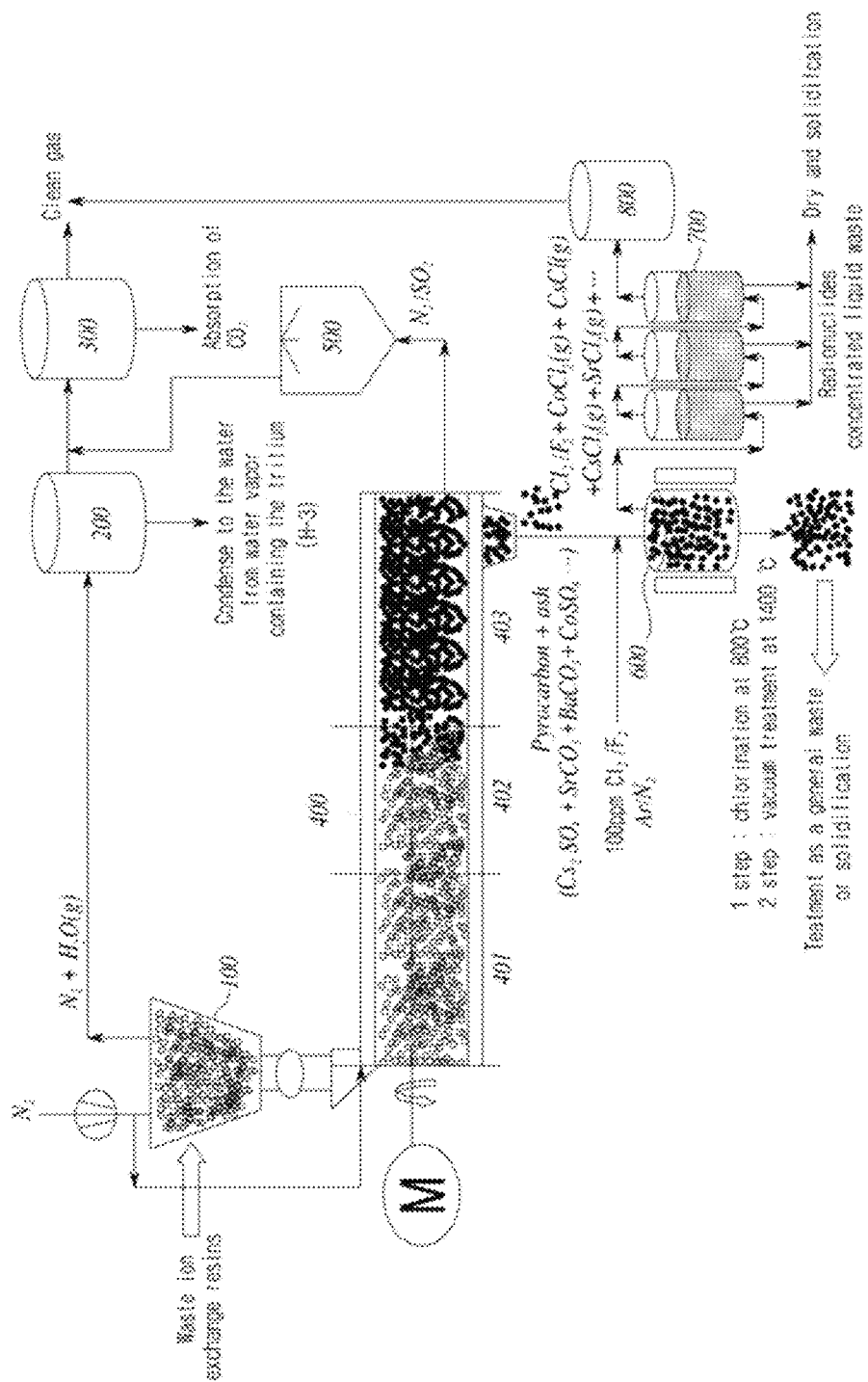
FIG. 1 is

Hereinafter, the present invention is described in detail.

The present invention provides a method for treating waste ion exchange resins containing radionuclides comprising the following steps:
drying waste ion exchange resins containing radionuclides (step 1);
separating the ion exchanger containing radionuclides from the dried waste ion exchange resin (step 2);

converting the volatile compound containing radionuclides obtained from the ion exchanger separated above into non-volatile sulfur oxides containing radionuclides (step 3);

converting the sulfur oxides containing radionuclides above into chlorides containing radionuclides (step 4); and separating and collecting radionuclides from the chlorides containing radionuclides above by volatilization and condensation (step 5).

Hereinafter, the method of the invention for treating waste ion exchange resin containing radionuclides is described in detail step by step.

In the method of the invention for treating waste ion exchange resin containing radionuclides, step 1 is to dry the waste ion exchange resin containing radionuclides.

This step is to eliminate $H_2O$ and $CO_2$ in the waste ion exchange resin through gasification by heating, wherein soluble solids and floating solids included in the waste ion exchange resin can be concentrated.

The said waste ion exchange resin is resulted from a long used ion exchange resin which is used for the separation and purification in water treatment processes in various industrial fields including nuclear power industry. That is, the waste ion exchange resin used to be an ion exchange resin used in various fields such as production of pure water, waste water treatment, collection of high value products, medicinal field, and food purification, etc. In particular, it can be a waste ion exchange resin containing radionuclides which is resulted from the long term use of an ion exchange resin in the course of the purification of waste water containing radionuclides in a nuclear power plant.

The waste ion exchange resin herein can be originated from an ion exchange resin containing a functional group that can be ionized by the chemical conjugation with a polymeric gas. More specifically, when ions included in the functional group of the ion exchange resin are replaced with radionuclides included in waste water, the ion exchange resin turns into the waste ion exchange resin. For example, the ion exchange resin can include a functional group containing sulfonic acid group ($SO_3H+$) in styrene-divinylbenzene copolymer gas and the substitution of cations in the ion exchange resin with radionuclides included in waste water results in the waste ion exchange resin containing radionuclides.

The ion exchange resin, for example, can contain cations such as hydrogen ions to eliminate radionuclides including Cs in nuclear power plant waste water, and at this time if there is a Cs ion having 2+ electric charge around in a surrounding solution, this ion can be substituted with two hydrogen ions having +1 electric charge each, resulting in the waste ion exchange resin.

The step to dry the waste ion exchange resin above is to eliminate moisture included in the waste ion exchange resin. The drying process can be performed at 100~150° C. If the temperature is lower than 100° C., moisture is not gasified. On the other hand, if the temperature is higher than 150° C., the ion exchanger is separated, so that not only moisture but also gas including $SO_2$ are discharged, which is a problem.

In the method of the invention for treating waste ion exchange resin containing radionuclides, step 2 is to separate the ion exchanger containing radionuclides from the dried waste ion exchange resin.

The separation of the ion exchanger is to separate radionuclides from the waste ion exchange resin, and the radionuclides separated in step 2 can stay as a volatile oxide or hydroxide.

Hereinafter, the process of the separation of ion exchanger in step 2 is described in FIG. 2 in more detail.

Figure 2:
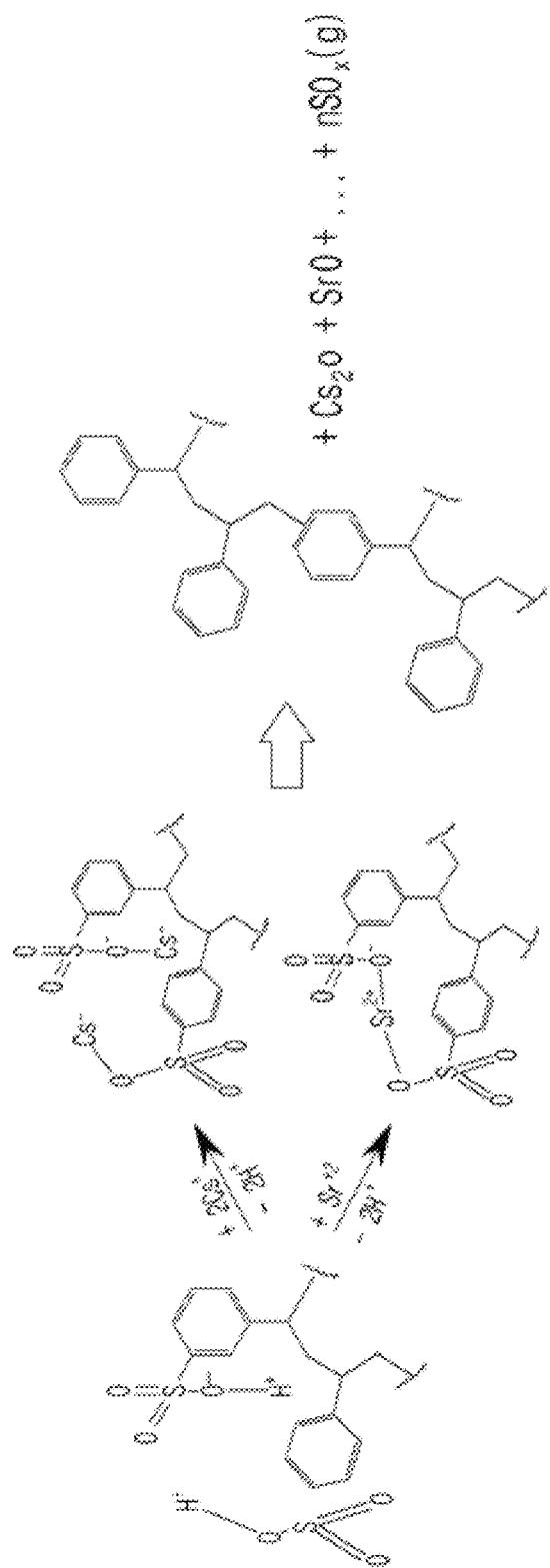
FIG. 2 is a schematic diagram illustrating the separation of the functional groups containing $SO_3H+$ and radionuclides such as Cs and Sr from waste ion exchange resin.

As shown in FIG. 2, the waste ion exchange resin containing radionuclides above can contain a functional group ($SO_3M^+$) harboring styrene-divinylbenzene copolymer, and at this time, the ion exchanger above can be the functional group $SO_3M^+$ containing sulfonic acid group ($SO_3H^+$) or radionuclide cation ($M^+$).

The ion exchanger included in the waste ion exchange resin above can be separated by the process of step 2. After the separation, gas containing styrene-divinylbenzene copolymer, oxide containing radionuclides, and sulfur dioxide ($SO_2$) can be generated.

At this time, the separation of ion exchanger in step 2 can be performed at 150~400° C.

If the temperature is lower than 150° C., the separation of ion exchanger from the waste ion exchange resin is not completed properly. On the other hand, if the temperature is higher than 400° C., the generation of sulfur dioxide gas ($SO_2$) is accelerated, which means the time for it to stay in the reactor is short so that the contact between sulfur dioxide gas ($SO_2$) and radionuclides is not smoothly completed, in other words, non-reacted radionuclides and $SO_2$ gas can be generated.

It is important for the generated sulfur dioxide gas ($SO_2$) to stay in the reactor long enough to be able to react with radionuclides in the waste ion exchange resin in order to be converted into sulfur oxides containing radionuclides. In step 2 above, an organic material is not decomposed and only a small volume of sulfur dioxide gas ($SO_2$) that remains non-reacted with radionuclides is discharged. Therefore, unlike the conventional process for treating waste ion exchange resin such as incineration and vitrification, the method of the invention does not generate a large volume of exhaust gas containing $SO_2$ and $SO_3$, suggesting that the method of the invention does not need a large capacity exhaust gas treatment equipment.

If sulfur dioxide ($SO_2$) remains in gas, even though it is a small amount, radionuclides can be converted into sulfur oxides. So, the volatile radionuclides can be converted into sulfur oxides containing non-volatile radionuclides by keeping the sulfur dioxide ($SO_2$) generated in step 2 instead of discharging it.

Figure 3A:
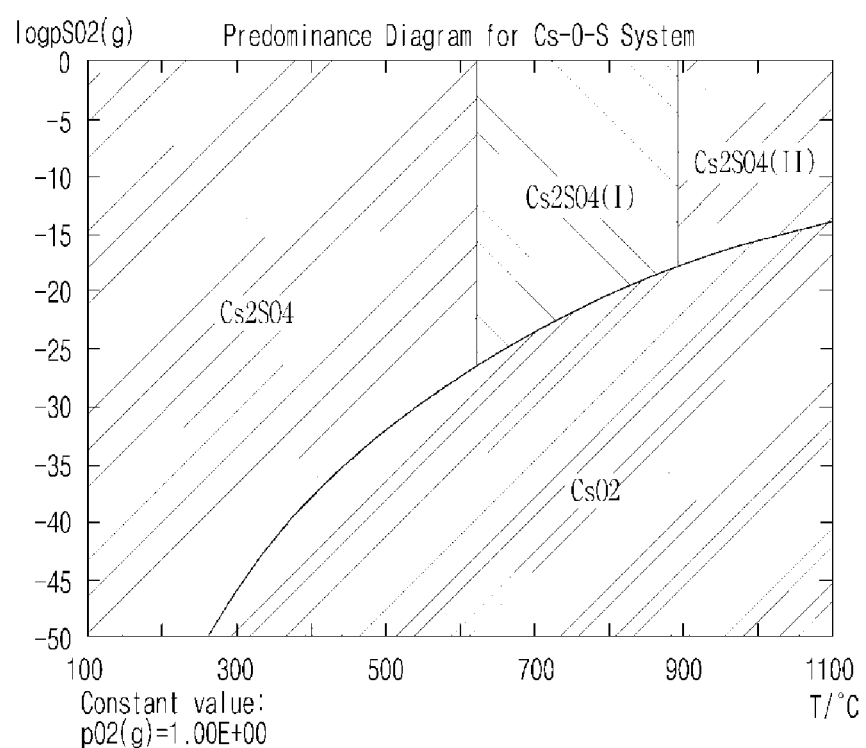
FIG. 3 is a set of graphs illustrating the morphology of the compounds possibly formed in Cs—O—S system according to temperature and $pO_2$.
Figure 3B:
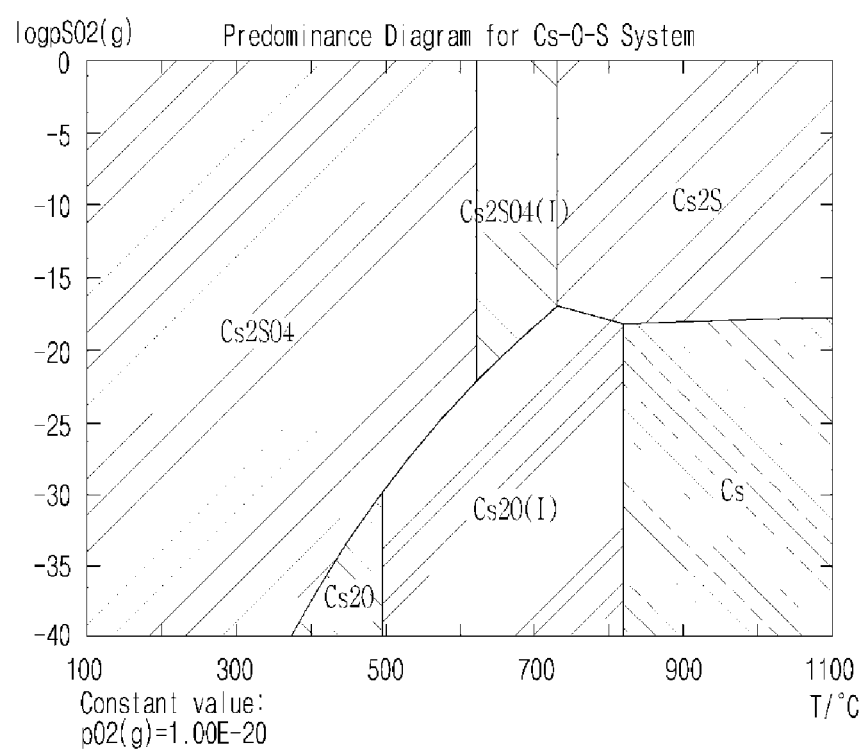

As an example, FIG. 3 presents a compound form that can be generated in Cs—O—S system according to temperature and oxygen partial pressure. Among the oxides containing radionuclides, $CsO_4$ is an example of the compound that can be generated in the presence of $SO_2$. As shown in FIG. 3, radioactive cesium (Cs) can be converted into $Cs_2SO_4$, a non-volatile sulfur oxide form, when $SO_2$ partial pressure is at least $10^{-15}$ atm regardless of temperature or oxygen partial pressure ($pO_2$).

In the method of the invention for treating waste ion exchange resin containing radionuclides, step 3 is to convert the compound containing volatile radionuclides generated in the ion exchanger separated above into sulfur oxides containing non-volatile radionuclides.

At this time, the conversion of sulfur oxides in step 3 is performed at the temperature between 400~550° C.

If the temperature for the conversion into sulfur oxides in step 3 is lower than 400° C., the conversion of the compound containing radionuclides into sulfur oxides will be too slow so that radionuclides might not be completely converted into sulfur oxides. On the other hand, if the temperature for the conversion into sulfur oxides in step 3 is higher than 550° C., the compound containing radionuclides can be gasified and discharged even before being converted into sulfur oxides.

For example, cesium turns into gas in the forms of $Cs_2O$, CsOH, and $Cs_2O_2H_2$ at the temperature of 550° C. and higher.

The radionuclide replaced in the waste ion exchange resin above can be one or more compounds selected from the group consisting of Cs, Sr, Mn, Fe, Ba, Ni, and Co. The sulfur oxide containing the converted radionuclides can be one or more compounds selected from the group consisting of $Cs_2SO_4$, $SrSO_4$, $BaSO_4$, $NiSO_4$, $FeSO_4$, $MnSO_4$, and $CoSO_4$. At this time, the sulfur oxide containing the said radionuclides is non-volatile, so that the radionuclide therein is not gasified at the temperature of 700° C. or under.

In the meantime, the method of the invention can additionally include a step of forming carbonized materials from the remaining organic material generated in the waste ion exchange resin whose ion exchanger was separated in step 2 above. At this time, the carbonization of the remaining organic material is preferably performed at 550~700° C., but not always limited thereto.

The remaining organic material above can include carbon, oxygen, hydrogen, and nitrogen. The remaining organic material containing oxygen, hydrogen, and nitrogen can be gasified at 550~700° C. and the remaining carbon component can be converted into carbonized materials.

In step 3 and the additional step of forming carbonized materials, the volatile compound containing radionuclides can be converted into non-volatile sulfur oxides containing radionuclides. A small amount of each hydrogen, nitrogen, and oxygen included in the remaining organic component in the waste ion exchange resin gas such as divinylbenzene copolymer can be gasified, and the carbon component therein can be carbonized. At this time, the component that would be gasified includes neither radionuclides nor sulfur dioxide ($SO_2$) gas. Therefore, the problems caused by the conventional method such as the deposition of volatile radionuclides, the discharge of radionuclides together with exhaust gas in the air, and the generation of exhaust gas containing sulfur dioxide ($SO_2$) gas can be prevented.

In the method of the invention for treating waste ion exchange resin containing radionuclides, step 4 is to convert the sulfur oxides containing radionuclides into chlorides containing radionuclides.

At this time, the conversion into chlorides containing radionuclides is performed preferably at 800~900° C.

If the temperature for the conversion into chlorides in step 4 is lower than 800° C., the chlorination process would be too slow. If the temperature for the conversion into chlorides in step 4 is higher than 900° C., the chlorination equipment can be corroded.

The sulfur oxide containing radionuclides is a stable material at high temperature, but it can be converted into a chloride in the presence of chlorine gas via the reaction with the chlorine gas.

Figure 4:
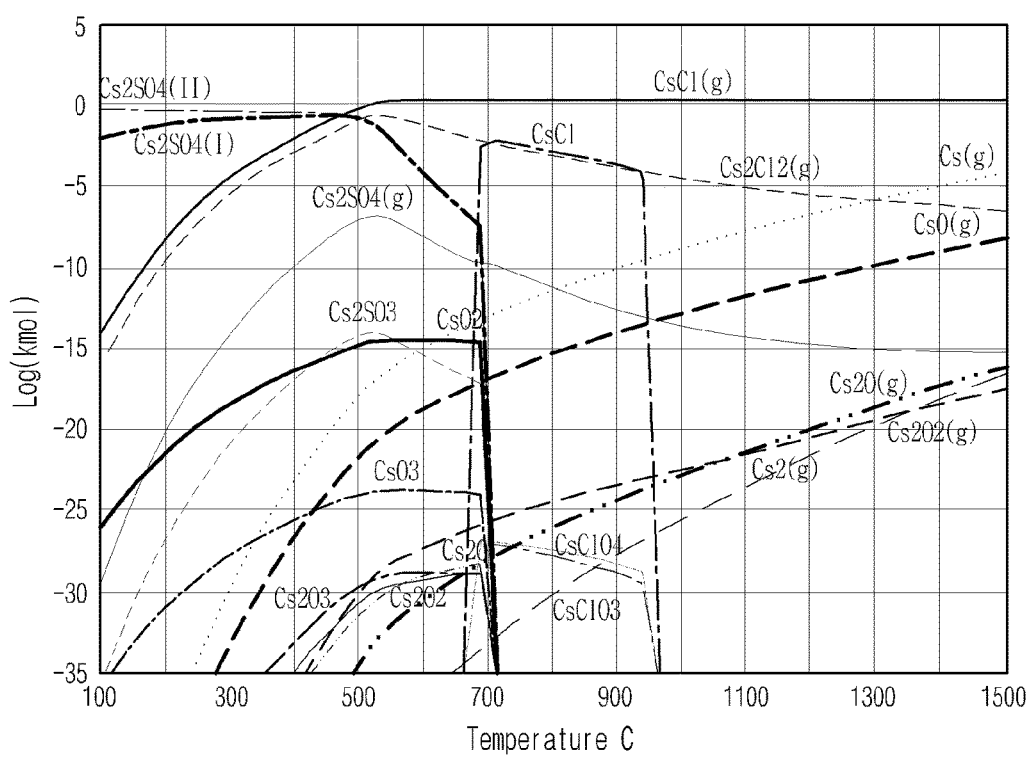
FIG. 4 is a graph illustrating the temperature and thermodynamic equilibrium concentration for the conversion of $Cs_2SO_4$ into a chloride according to step 4 of example 1.
Figure 5:
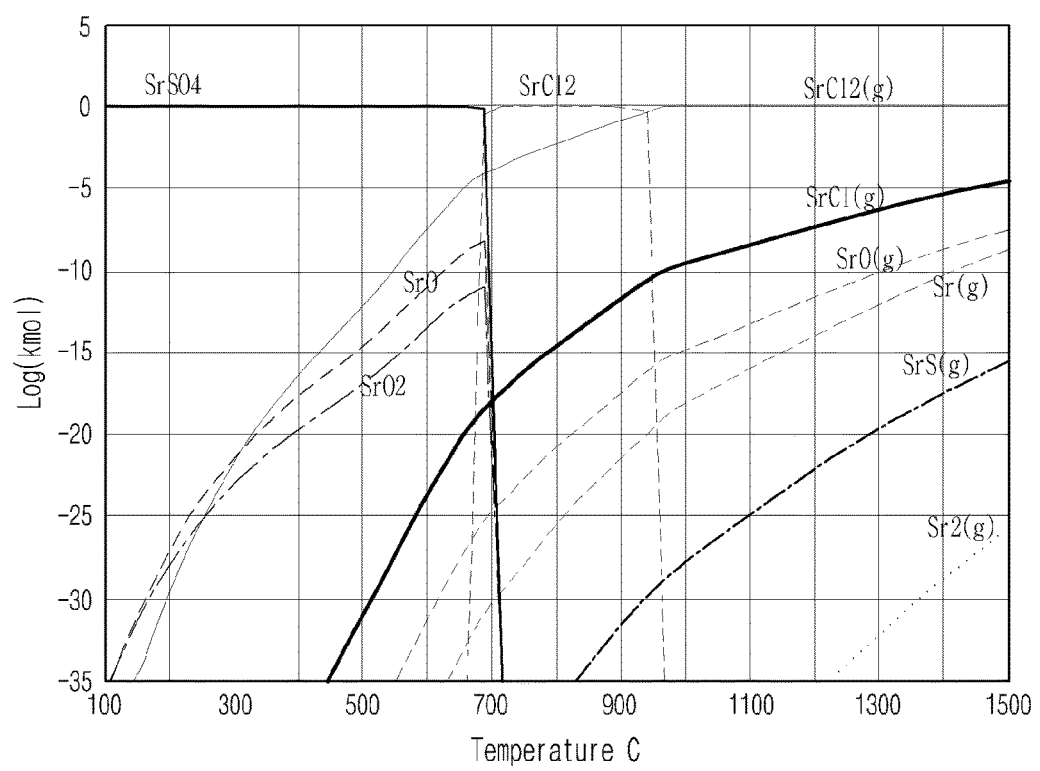
FIG. 5 is a graph illustrating the temperature and thermodynamic equilibrium concentration for the conversion of $SrSO_4$ into a chloride according to step 4 of example 1.
Figure 6:
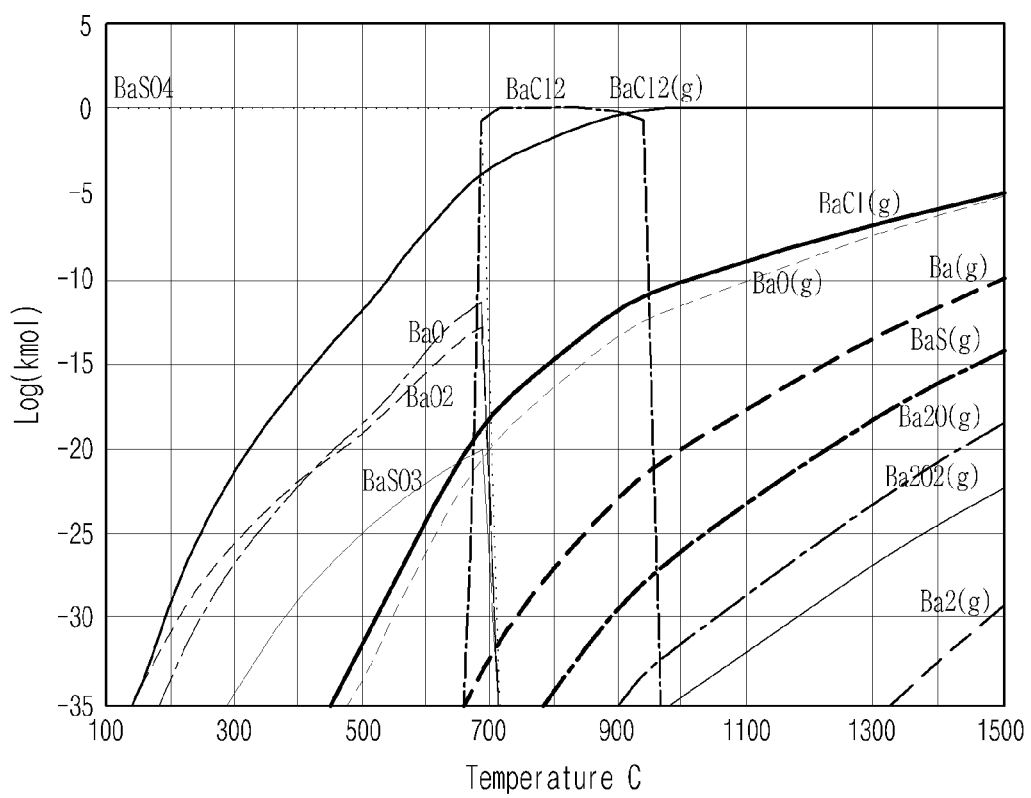
FIG. 6 is a graph illustrating the temperature and thermodynamic equilibrium concentration for the conversion of $BaSO_4$ into a chloride according to step 4 of example 1.

As an example, FIG. 4~FIG. 6 present graphs illustrating the forms of compounds which can be generated when $O_2$ and $Cl_2$ are included in the inactive gas $N_2$ or Ar at the concentration of 100 ppm each and one or more compounds selected from the group consisting of $Cs_2SO_4$, $SrSO_4$, and $BaSO_4$ are added thereto at as small concentration as 1 ppm each.

As shown in FIG. 4~FIG. 6, when $O_2$ and $Cl_2$ are included in the inactive gas $N_2$ or Ar at the concentration of 100 ppm each and one or more compounds selected from the group consisting of $Cs_2SO_4$, $SrSO_4$, and $BaSO_4$ are added thereto at as small concentration as 1 ppm each, the sulfur oxides containing radionuclides can be converted into chlorides at at least 800° C.

In step 4, the carbon component does not chlorinated or gasified by $Cl_2$. Therefore, the carbon component does not volatilized by the high temperature treatment at 1400° C. or up in step 5 and instead remains as carbonized material.

In the method of the invention for treating waste ion exchange resin containing radionuclides, step 5 is to separate and collect radionuclides from the chlorides containing radionuclides by volatilization and condensation.

In step 5, radionuclides can be volatilized and then condensed, followed by fixation. The carbon component can be separated as carbonized materials in this step. Thus, the method of the invention can give the maximum volume reduction effect in the course of discarding radionuclides and is advantageous in reducing $CO_2$ generation, so that this method is a pro-environmental and efficient method for treating waste ion exchange resin.

At this time, the volatilization of radionuclides in step 5 is induced at 1400~1500° C. under the reduced pressure up to 1 Torr. This condition is suitable for volatilizing the chlorinated radionuclide. If the temperature for the volatilization of radionuclides in step 5 is under 1400° C., the volatilization of radionuclide chlorides is not completed quickly, suggesting that the treatment period is longer. If the temperature is higher than 1500° C., energy waste is expected.

In the meantime, the separated radionuclides by volatilization can be condensed and fixed. A carbonized material is not volatilized in step 5. Therefore, the carbonized material would stay even after the radionuclides are volatilized. The remaining carbonized material does not contain radioactive materials, so that it can be recycled or treated as a general waste.

The present invention also provides an apparatus for the treatment of waste ion exchange resins containing radionuclides, which is composed of:

a dryer (100) to dry the waste ion exchange resin containing radionuclides;

a screw conveyor reactor (400) to heat-treat the dried waste ion exchange resin discharged from the dryer above, stepwise; and an inorganic chlorination reactor (600) to convert the reactant discharged from the screw conveyor reactor above into a chloride.

Hereinafter, the apparatus for the treatment of waste ion exchange resins containing radionuclides of the present invention is described in more detail with the figures.

As shown in the process drawing of FIG. 1, the apparatus for the treatment of waste ion exchange resins containing radionuclides of the invention is composed of a dryer (100), a screw conveyor rector (400), an inorganic chlorination reactor (600), and a wet scrubber (700).

The dryer (100) of the invention is a device for the elimination of moisture included in the waste ion exchange resin, which can be operated at 100~150° C.

To dry the waste ion exchange resin in the dryer above, the dryer can include tritium (H-3) and radioactive carbon (C-14) in addition to water vapor ($H_2O$) and carbon dioxide ($CO_2$) separated by gasification. To discharge the separated gas after cleaning, the dryer can be additionally equipped with a moisture condenser (200) and a $CO_2$ absorption/recovery equipment (300). To help vapor and carbon dioxide separated by gasification be discharged from the dryer (100) through the moisture condenser (200) and the $CO_2$ absorption/recovery equipment (300), $N_2$ or Ar, the inactive gas, can be supplied into the gas tunnel.

The screw conveyor reactor (400) of the invention is a device to heat-treat the waste ion exchange resin passed on from the dryer (100) phase-dependently, which includes two different regions having different temperatures each other. That is, the screw conveyor reactor (400) has two different regions, which are the ion exchanger separation region (401) and the sulfur oxide conversion region (402). The carbonized material generation region (403) can be additionally included in this device.

The ion exchanger separation region (401) in the screw conveyor rector (400) can be operated at 150~400° C. The heat-treatment in this region is to separate the ion exchanger including sulfonic acid group ($SO_3H^+$) and $SO_3M^+$ in the waste ion exchange resin. Oxides or hydroxides can be formed or sulfur dioxide ($SO_2$) can be generated after the separation of the ion exchanger including sulfonic acid group ($SO_3H^+$) and $SO_3M^+$.

The sulfur oxide conversion region (402) in the screw conveyor rector (400) is connected to the ion exchanger separation region (401), and can be operated at 400~550° C. The heat-treatment in the sulfur oxide conversion region (402) is performed to form a sulfur oxide containing radionuclides. In this region, the volatile radionuclides separated in the ion exchanger separation region above are converted into non-volatile radionuclides and thus discharge of sulfur dioxide gas can be prevented.

In the meantime, the screw conveyor reactor (400) can additionally contain the carbonized material formation region (403) next to the sulfur oxide conversion region (402). The carbonized material formation region (403) can be operated at 550~700° C. The heat-treatment in the carbonized material formation region (403) is performed to discharge oxygen, hydrogen, and nitrogen included in the remaining organic compound and to carbonize the carbon component therein, by which gasification of carbon compound can be prevented when the radionuclides are separated via volatilization.

The screw conveyor rector (400) can additionally contain a heat-generator that is equipped outside of the reactor in the form of a heater. Most reaction induced in the screw conveyor reactor (400) is endothermic reaction. So, the temperature of the inside of each reactor can be properly maintained by the heat-generator containing a heater equipped outside of the reactor.

The inorganic chlorination reactor (600) of the invention is a device to convert sulfur oxides among the reactants that had passed through the screw conveyor rector (400) into chlorides containing radionuclides. Chlorine and oxygen gas can be injected in the reactor. The reactor is operated at 800~900° C.

The chlorides containing radionuclides converted from sulfur oxides in the inorganic chlorination reactor (600) are heat-treated at 1400~1500° C., by which the radionuclide are volatilized and recovered. At this time, the wet scrubber (700) can be connected to the inorganic chlorination reactor. The wet scrubber (700) is to condense the radionuclides released from the inorganic chlorination reactor (600) by volatilization. The liquid waste, wherein radionuclides are concentrated, released from the wet scrubber (700) is dried and solidified, resulting in the separation and collection of the radionuclides.

Practical and presently preferred embodiments of the present invention are illustrative as shown in the following Examples.

However, it will be appreciated that those skilled in the art, on consideration of this disclosure, may make modifications and improvements within the spirit and scope of the present invention.

Example 1

Step 1: The waste ion exchange resin wherein Cs radionuclide was substituted in the ion exchange resin containing sulfonic acid group ($SO_3H^+$) in styrenedivinylbenzene copolymer gas was used. The waste ion exchange resin was placed in the dryer (100) and dried at 150° C. for 2.5 hours.

Step 2: The waste ion exchange resin dried in step 1 was put in the ion exchanger separation region (401) of the screw conveyor reactor (400), which was heated at 350° C. The temperature at inlet was maintained at about 150° C. and the temperature of the high temperature region in this region was up to 400° C. The sulfur dioxide gas generated at this time was slowly discharged through the sulfur oxide conversion region.

Step 3: The reactants obtained in step 2 were heat-treated in the sulfur oxide conversion region (402) of the screw conveyor reactor (400) at about 550° C. for 30 minutes.

Step 4: The reactants obtained in step 3 were heat-treated in the carbonized material formation region (403) of the screw conveyor reactor (400) at about 700° C. for 2 hours, followed by discharge.

Step 5: The reactants resulted from step 4 were put in the inorganic chlorination reactor (600), followed by heat-treatment in the presence of chlorine gas 100 ppm, oxygen gas 100 ppm, and nitrogen gas 1 atm, at 800° C. for 90 minutes.

Step 6: The reactants resulted from step 5 were heat-treated at about 1400° C. in vacuum condition, by which the vaporized volatilized radionuclide was separated. The separated radionuclide was condensed in the wet scrubber.

BRIEF DESCRIPTION OF THE MARK OF DRAWINGS

100: dryer
200: moisture condenser
300: $CO_2$ recovery equipment
400: screw conveyor reactor
401: ion exchanger separation region
402: sulfur oxide conversion region
403: carbonized material generation region
500: $SO_2$ adsorption/absorber
600: chlorination reactor
700: wet scrubber
800: HEPA (high efficiency particulate air filter) filter system Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended Claims.

What is claimed is:

1. A method for treating waste ion exchange resins containing radionuclides comprising the following steps:
  drying waste ion exchange resins containing radionuclides (step 1);
  separating an ion exchanger containing radionuclides from the dried waste ion exchange resin with maintaining sulfur dioxides in a reactor (step 2);
  converting a volatile compound containing radionuclides obtained from the ion exchanger separated above into non-volatile sulfur oxides containing radionuclides (step 3);

converting the sulfur oxides containing radionuclides above into chlorides containing radionuclides (step 4); and separating and collecting radionuclides from the chlorides containing radionuclides above by volatilization and condensation (step 5), wherein the separation of ion exchanger in step 2 is performed at 150~400° C.

2. The method for treating waste ion exchange resins containing radionuclides according to claim 1, wherein the method additionally includes a step of forming carbonized materials from the remaining organic material generated in the waste ion exchange resin whose ion exchanger was separated in step 2 above.

3. The method for treating waste ion exchange resins containing radionuclides according to claim 2, wherein the formation of carbonized materials is performed at 550~700° C.

4. The method for treating waste ion exchange resins containing radionuclides according to claim 1, wherein the drying in step 1 is performed at 100~150° C.

5. The method for treating waste ion exchange resins containing radionuclides according to claim 1, wherein the conversion into sulfur oxides containing radionuclides in step 3 is performed at 400~550° C.

6. The method for treating waste ion exchange resins containing radionuclides according to claim 1, wherein the conversion into chlorides containing radionuclides in step 4 is performed at 800~900° C.

7. The method for treating waste ion exchange resins containing radionuclides according to claim 1, wherein the volatilization of radionuclides in step 5 is performed at 1400~1500° C.

8. The method for treating waste ion exchange resins containing radionuclides according to claim 1, wherein the radionuclide is one or more compounds selected from the group consisting of Cs, Sr, Mn, Fe, Ba, Ni, and Co.

9. The method for treating waste ion exchange resins containing radionuclides according to claim 1, wherein the non-volatile sulfur oxide containing radionuclides in step 3 is one or more compounds selected from the group consisting of $Cs_2SO_4$, $SrSO_4$, $BaSO_4$, $NiSO_4$, $FeSO_4$, $MnSO_4$, and $CoSO_4$.

10. The method for treating waste ion exchange resins containing radionuclides according to claim 1, wherein the additional step of solidification of the radionuclides separated and recovered in step 5 is included.

* * * * *